(12) United States Patent
Alberghi et al.

(10) Patent No.: US 7,001,168 B2
(45) Date of Patent: Feb. 21, 2006

(54) PLANT FOR FORMING PREDETERMINED QUANTITIES OF SYNTHETIC MATERIAL

(75) Inventors: Pier Carlo Alberghi, Faenza (IT); Maurizio Borgatti, Imola (IT); Pietro Busacchi, Bologna (IT)

(73) Assignee: Sacmi-Cooperative Meccanici Imola-Soc. Coop. AR.L., Imola (IL)

( * ) Notice: Subject to any disclaimer, the term of this patent is extended or adjusted under 35 U.S.C. 154(b) by 347 days.

(21) Appl. No.: 10/235,856

(22) Filed: Sep. 6, 2002

(65) Prior Publication Data
US 2004/0013758 A1 Jan. 22, 2004

(30) Foreign Application Priority Data
Jul. 19, 2002 (IT) .......................... RE2002A0058

(51) Int. Cl.
*B29C 45/06* (2006.01)
*B29C 45/18* (2006.01)
(52) U.S. Cl. ........................ 425/110; 425/114; 425/261; 425/449; 425/572; 264/328.12
(58) Field of Classification Search ........ 425/110–114, 425/261, 449, 562–566, 572, 574, 809, 344–345, 425/588; 264/328.8, 328.12
See application file for complete search history.

(56) References Cited

U.S. PATENT DOCUMENTS

| | | | |
|---|---|---|---|
| 2,808,859 A | 10/1957 | Heinzelman et al. | |
| 3,102,304 A | 9/1963 | Divers | |
| 3,355,763 A | * 12/1967 | Willert | 425/190 |
| 4,412,797 A | 11/1983 | Murayama | |
| 5,186,956 A | * 2/1993 | Tanino et al. | 425/145 |
| 5,190,769 A | * 3/1993 | Murayama | 425/809 |
| 5,786,079 A | * 7/1998 | Alieri | 425/809 |
| 6,402,504 B1 | 6/2002 | Hahn et al. | |

FOREIGN PATENT DOCUMENTS

SU 1599221 10/1990

OTHER PUBLICATIONS

Patent Abstracts of Japan; vol. 013, No. 462, "Alternate Type Injection Molding Machine", Oct. 19, 1989.

* cited by examiner

*Primary Examiner*—Robert Davis
*Assistant Examiner*—Thu Khanh T. Nguyen
(74) *Attorney, Agent, or Firm*—Browdy and Neimark, PLLC (57) ABSTRACT

Plant for forming predetermined quantities of synthetic material comprising a rotary turntable carrying on its periphery a plurality of dispensing devices, and means for feeding the material in the molten state to said dispensing devices; the plant also comprises a fixed part directly connected to the molten material feed, a rotary sealed joint connecting said fixed part to the rotary turntable, operating means for interacting with the dispensing devices positioned on the rotary turntable to operate them in the sense of opening and closing them in response to the rotations of the turntable, and means for rotating the turntable.

11 Claims, 9 Drawing Sheets

PLANT FOR FORMING PREDETERMINED QUANTITIES OF SYNTHETIC MATERIAL

This invention relates to a plant for forming predetermined quantities of synthetic material intended to be subsequently used for example in compression moulds for moulding a final product.

Known compression moulding machines can be of continuous or alternating type.

With the first type of machine the predetermined quantities are produced continuously by the cutting action of a series of knives which are rotated on a turntable synchronous with a compression moulding turntable. Each of said knives cuts the plastic material emerging from a nozzle at constant throughput; the predetermined quantity cut off in this manner is conveyed by suitable devices rigid with the turntable into the deposition and moulding zone (cavity). In contrast, in alternating compression moulding machines the predetermined quantity is produced by a single dispenser fixed relative to the moulds which rotate on an intermittent turntable. When the mould pauses, it halts in correspondence with the dispenser to receive the predetermined quantity cut off by an internal shutter. The mould then closes and the plastic material is compressed; in this case the instantaneous throughput leaving the dispenser varies mainly on the basis of the position of the shutter (open or closed).

The productivity of known plants is little flexible and not adequate for current commercial production requirements.

An object of this invention is to provide a dispenser of predetermined quantities of synthetic material for feeding moulding devices, which is reliable, flexible and able to easily adapt to the production requirements of the plant.

This and further objects are attained according to the invention by the device the characteristics of which are defined in the claims. Specifically, the invention provides a plant for forming predetermined quantities of synthetic material comprising a plurality of forming devices disposed on a turntable and spaced angularly equidistant apart, they being fed with synthetic material in the molten state through a rotary joint.

Said joint consists of a fixed part comprising the feed conduit for the material in the molten state, and a part rotatable about the fixed part, with which said forming means are associated.

According to a first embodiment of the invention said movable part is provided with feed conduits for the forming devices in a number equal to the number of devices themselves, the fixed part being provided with a single feed conduit which feeds said devices one at a time in succession during the rotation of the movable part about the fixed part.

In a second alternative embodiment of the invention, all the forming devices are fed simultaneously.

These latter comprise a shutter rod which is opened by suitable mechanical, hydraulic, pneumatic or electrical operating means, in accordance with the angular position of the rotary part of the turntable.

In both said embodiments the quantity of material dispensed by the forming devices depends mainly on the time for which they are open, so that the dimensions of the predetermined quantity being formed can be regulated.

Moreover, the forming plant according to the invention can be associated with a usual compression moulding turntable for the predetermined quantities formed.

The operational and constructional characteristics of the invention will be more apparent from the ensuing description of various preferred embodiments thereof, given by way of non-limiting example and illustrated in the accompanying drawings.

FIGS. from 7 to 9 show alternative forms of the rotary joint illustrated in FIG. 6.

FIGS. from 10 to 12 show alternative forms of a constructional detail of the second embodiment of the invention illustrated in FIG. 5.

Said figures show the plant 1, comprising a rotary joint 2 forming a sealed connection between a fixed part 3 and a movable part 4.

The fixed part 3 is connected to usual feed means, not shown, for the synthetic material in the molten state, there being associated with the movable part 4 a plurality of identical usual devices 5 for forming cylindrical predetermined quantities of synthetic material.

Figure 1:
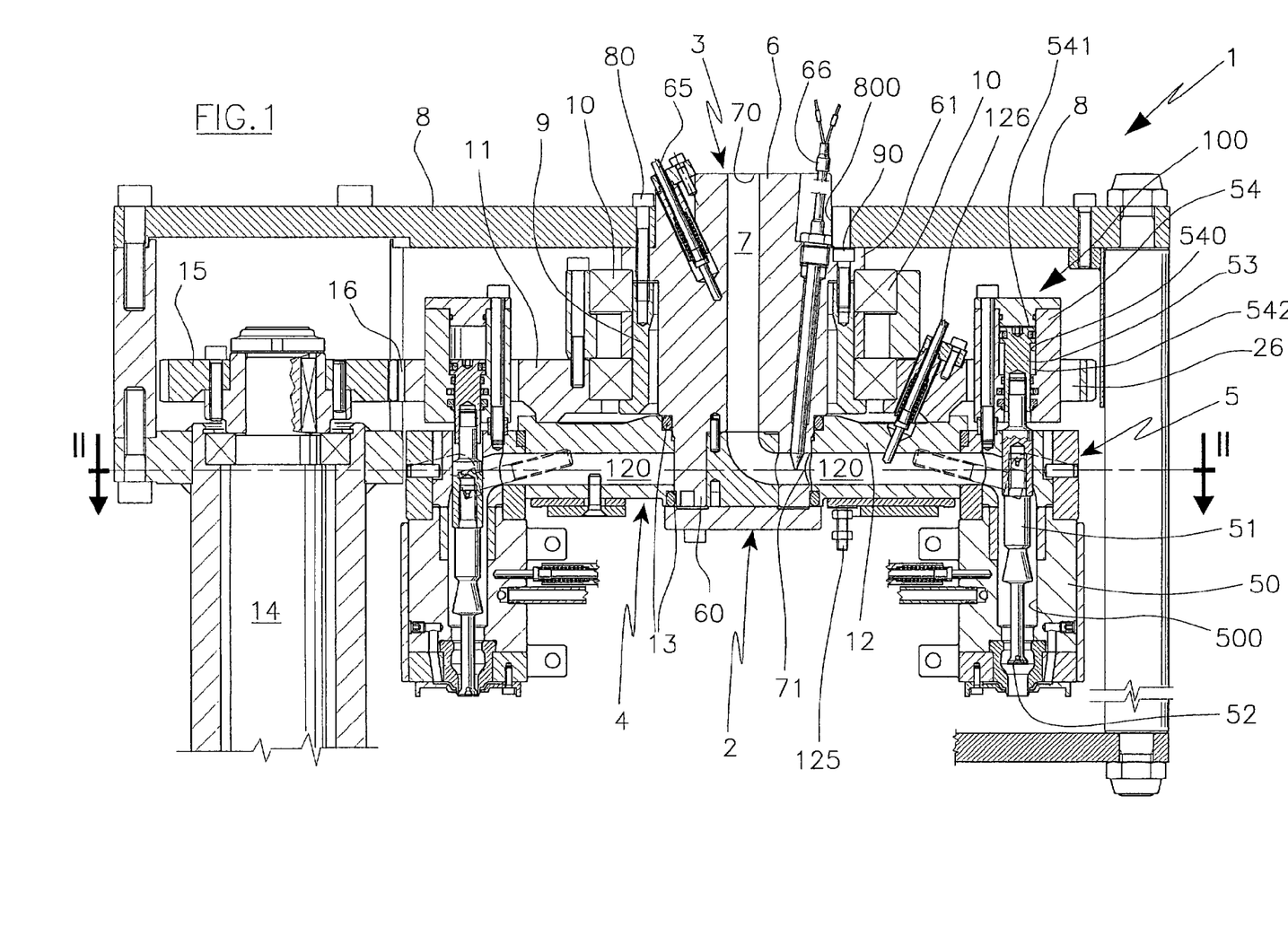
FIG. 1 is an axial section through a first embodiment of the invention.

With reference to FIG. 1, the fixed part 3 comprises a fixed body 6 provided with an inner axial conduit 7 acting as the material feed conduit, its entry mouth 70 opening in correspondence with the upper end of the body 6, and its discharge mouth 71 opening in a direction perpendicular to the axis of the mouth 70, in proximity to the side wall of the lower cylindrical stem 60 of the body 6.

The body 6 is inserted into the central hole 800 of a plate 8, to which the body 6 is fixed. The body 6 upperly presents an annular shoulder 61 which rests against the lower surface of the fixed plate 8, to which the body is rigidly connected by screws 80.

The body 6 is provided with usual electrical resistance elements, not shown, to heat the body in order to prevent cooling of the molten synthetic material which flows into the conduit 7. The body 6 is also provided with sensors 65 and 66 for measuring the temperature of the molten material, located in correspondence with the discharge mouth 71 of the conduit 7.

Figure 2:
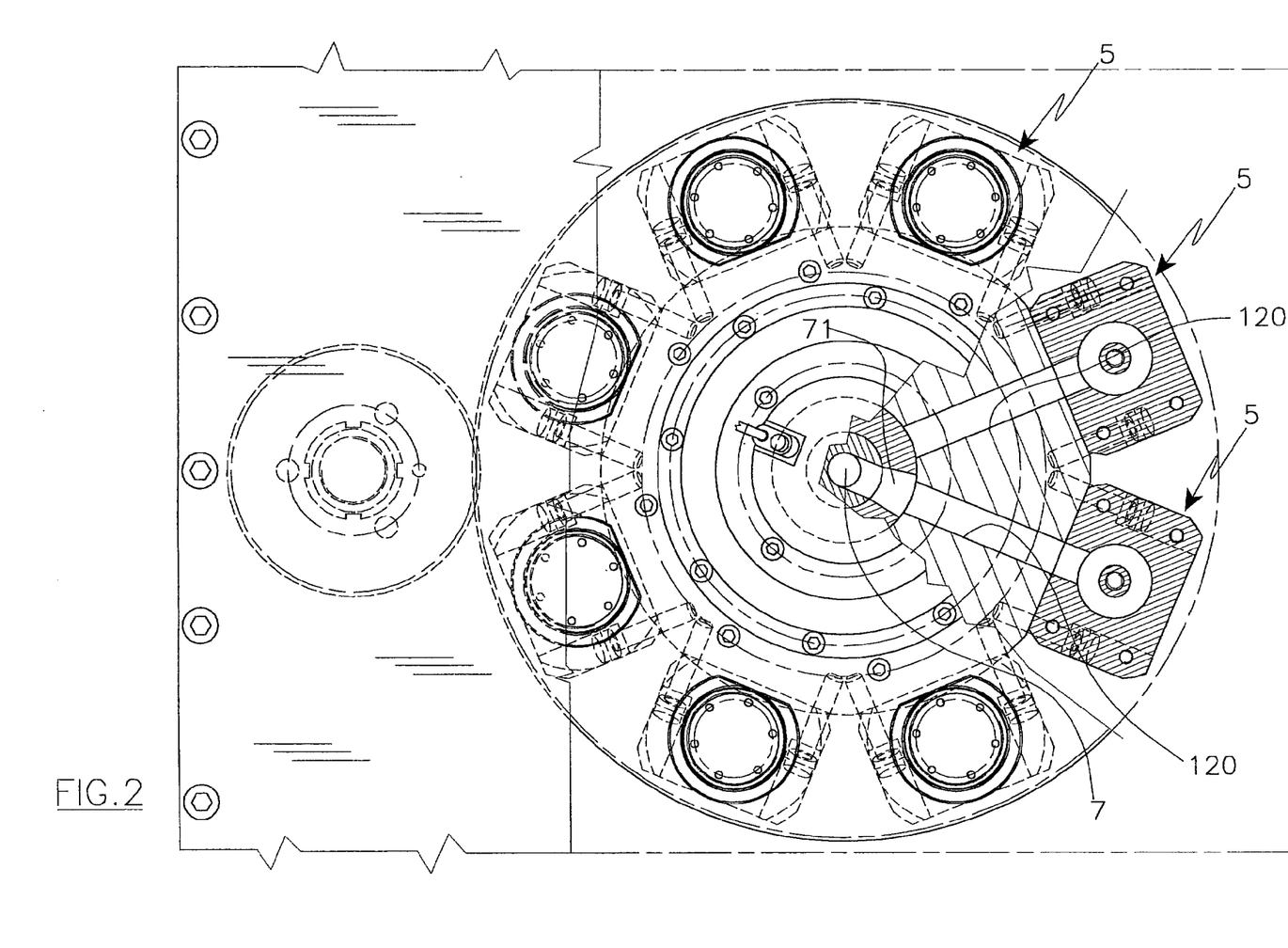
FIG. 2 is the section II—II of FIG. 1.

With reference to FIG. 2, the conduit 70 in that portion adjacent to the discharge mouth 71 has a diverging shape for the reasons explained hereinafter.

A cylindrical sleeve 9 is mounted on the outside of the body 6 and is fixed to the annular shoulder 61 by screws 90.

Said sleeve 9 carries two rolling bearings 10 with which the movable part 4 of the rotary joint 2 is associated.

With said bearings 10 there is associated an annular part 11, to the underside of which there is fixed a ring 12 mounted on the lower stem 61 of the body 6 by way of suitable seal gaskets 13.

The ring 12 is provided with a plurality of radial conduits spaced angularly equidistant apart, their axes being coplanar with the axis of the discharge mouth 71 of the conduit 7.

That mouth of the conduits 120 which opens into the outer surface of the ring 12 communicates with the feed port of the forming devices 5 which are fixed to the ring 12.

Instead, that mouth of the conduits 120 which opens into the inner surface of the ring is brought into communication, during the rotation of the movable part 4 about the fixed part of the joint 2, with the discharge mouth 71 of the conduit 7 at each complete revolution of the ring 12.

The ring 12 is provided with resistance elements for heating the body of the ring to prevent cooling of the material fed to the forming devices 5.

In the embodiment shown in FIG. 1, an annular resistance element 125 can be seen fixed to the lower side of the ring in correspondence with the conduit 120.

The movable part 4 of the joint, which comprises the forming devices 5, the annular part 11 and the ring 12, is connected to a suitable geared motor, of which only the shaft 14 is shown in the figures.

A pinion gear 15 is keyed onto the shaft 14 of said geared motor and engages a mating ring gear 16 rigid with the annular part 11, to rotate this latter.

The devices 5 are provided in a number equal to the number of conduits 120 and are positioned in correspondence with the discharge mouths of these conduits.

Each device 5 comprises a lower body 50 fixed to the ring 12 and provided with a central hole 500 within which a rod 51 slides, with the lower end of which there is associated a shutter 52 intended to shut off the lower mouth of the hole 500 from the inside.

The upper end of the rod 51 is associated with suitable operating means 100 for the rod itself. These means comprise a cylinder-piston unit consisting of a piston 53 which slides within a cylindrical cavity 540 in a socket-shaped body 54. Said piston 53 is provided with a lower stem rigid with the upper end of the rod, so that the axial translations of the piston 53 within the cavity 540 determine axial translations of the rod 51. Specifically, the piston 53 divides the internal volume of the cavity into two chambers 541 and 542, at each of which there terminates a fluid feed conduit, not shown. Feeding fluid into one of the cavities causes the piston 53 to translate.

The devices enable the duration of each delivery, and hence the dimensions of the predetermined quantities formed, to be regulated in a simple and rapid manner, without the need for mechanical intervention on the plant.

Figure 3:
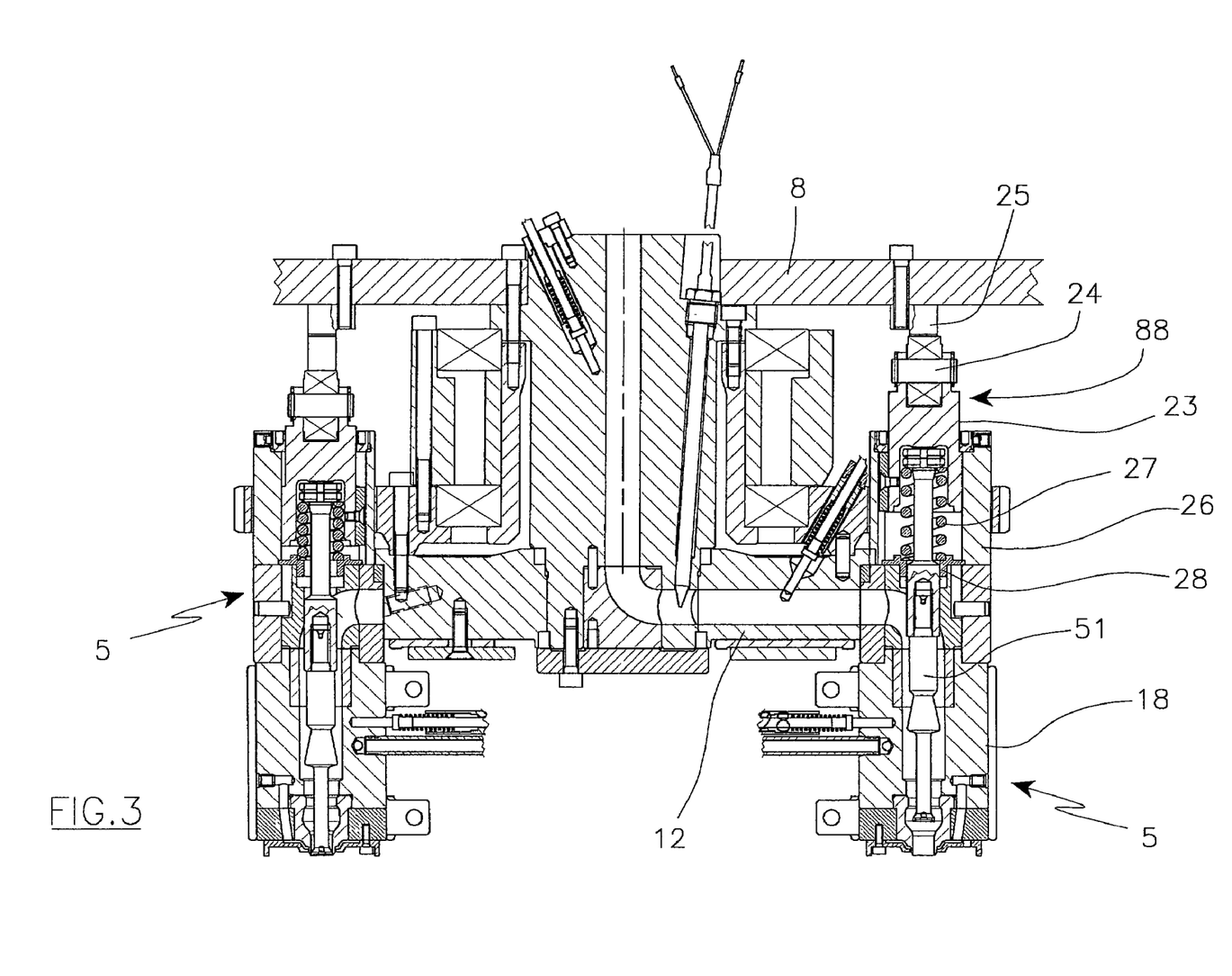
FIG. 3 shows a first variant of the first embodiment of the invention, for forming cylindrical predetermined quantities.
Figure 4:
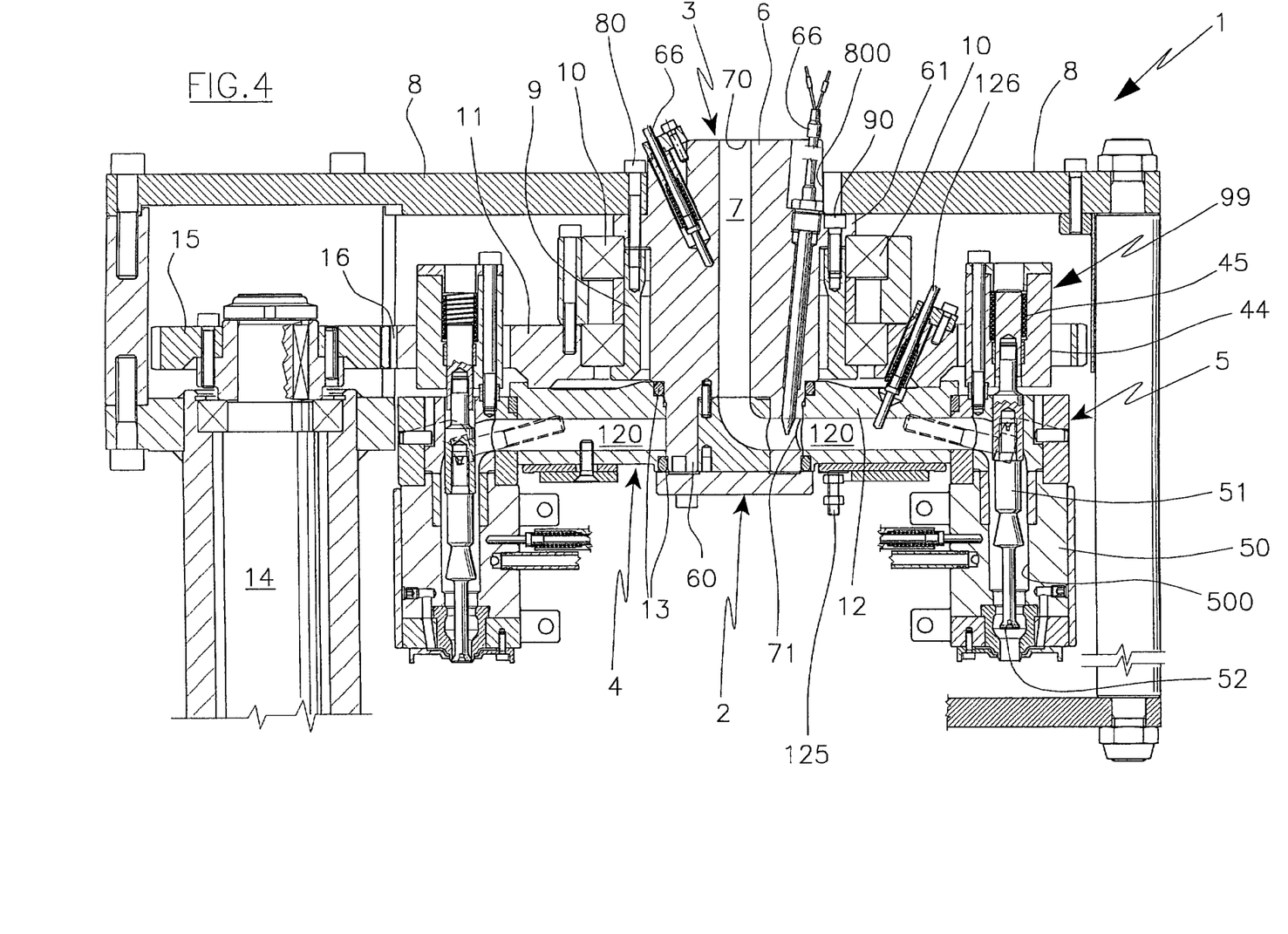
FIG. 4 shows a second variant of the first embodiment of the invention.

The operating means can also be of different type, such as shown in FIGS. 3 and 4.

With reference to FIG. 3, this shows that the rod operating means, indicated by the reference numeral 88, are of mechanical type and comprise a socket-shaped body 23 associated with the upper end of the rod 51. At its free end, the socket-shaped body 23 carries an idle cam follower wheel 24 arranged to interact with an overlying cam 25.

The circular cam 25 is rigid with the plate 8, and as a result of the rotation of the plate 12 and of the relative devices 5 causes the rod 51 and hence the shutter to translate cyclically, to discharge the predetermined quantity of material.

The socket-shaped body 23 slides within a guide sleeve 26 rigid with a lower part 18 and inserted into a hole provided in the annular part 11. The sleeve 26 is provided with an upper ring which acts as a stop element for the travel of the socket 23, which is normally maintained against said ring by virtue of a spring 27 positioned inside the socket-shaped body and mounted about the rod 51.

The lower end of the spring 27 rests on a guide element 28 for the rod 51, whereas the upper end of the spring rests against an upper enlargement of the rod 51.

FIG. 4 shows operating means 99 of electrical type. With reference to this figure, the rod 51 is provided with a cylindrical upper portion of magnetic material, and is arranged to slide within a socket-shaped body 44 with which a coil 45 is associated. Energizing the coil, done by totally usual means, not shown, causes the rod carrying the shutter to translate upwards, to hence enable the predetermined quantity of material to be formed.

Finally, said operating means can also be of hydraulic type, and constructionally totally similar to the pneumatic operating means shown in FIG. 1.

Figure 5:
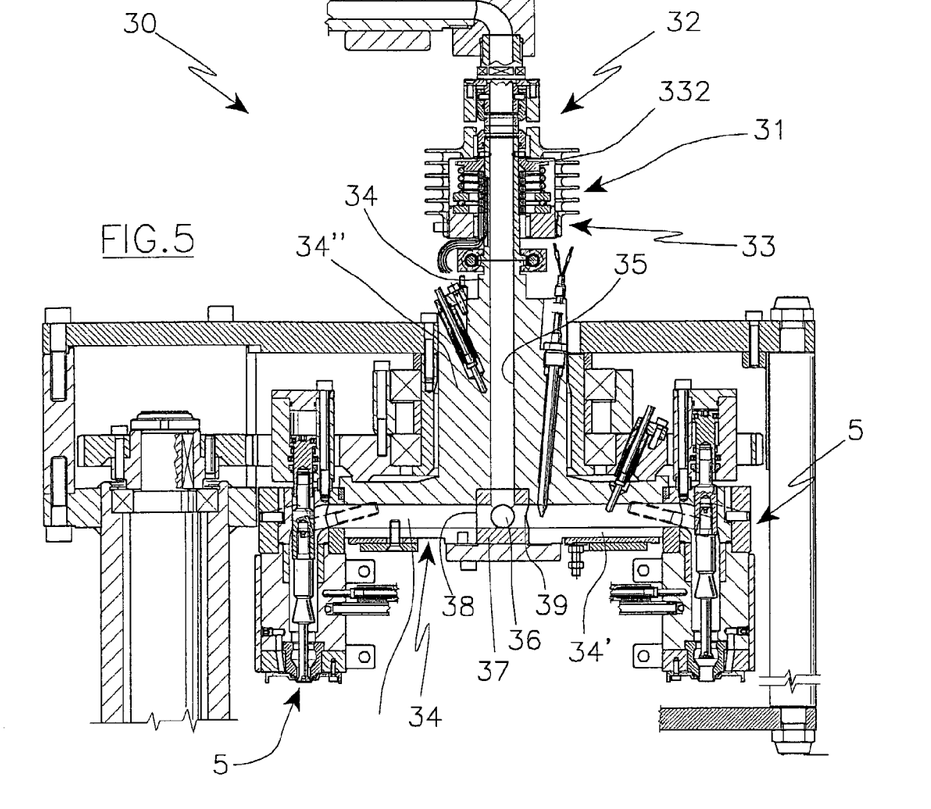
FIG. 5 is an axial section through a second embodiment of the invention.
Figure 6:
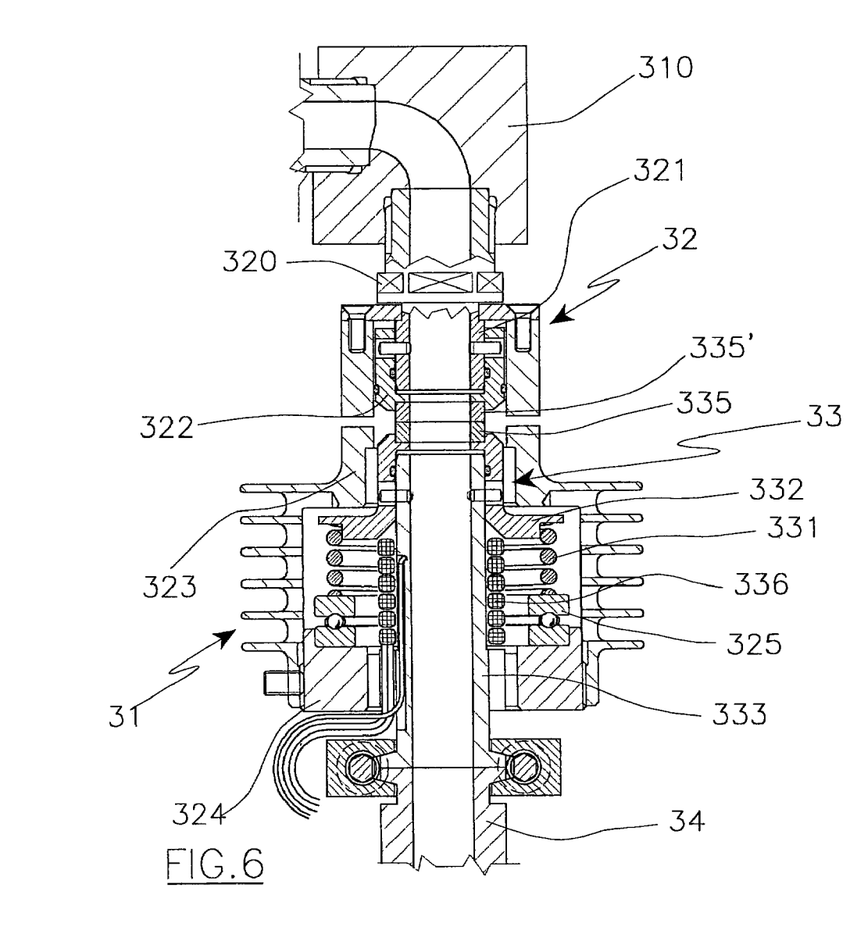
FIG. 6 shows an enlarged portion of FIG. 5.
Figure 7:
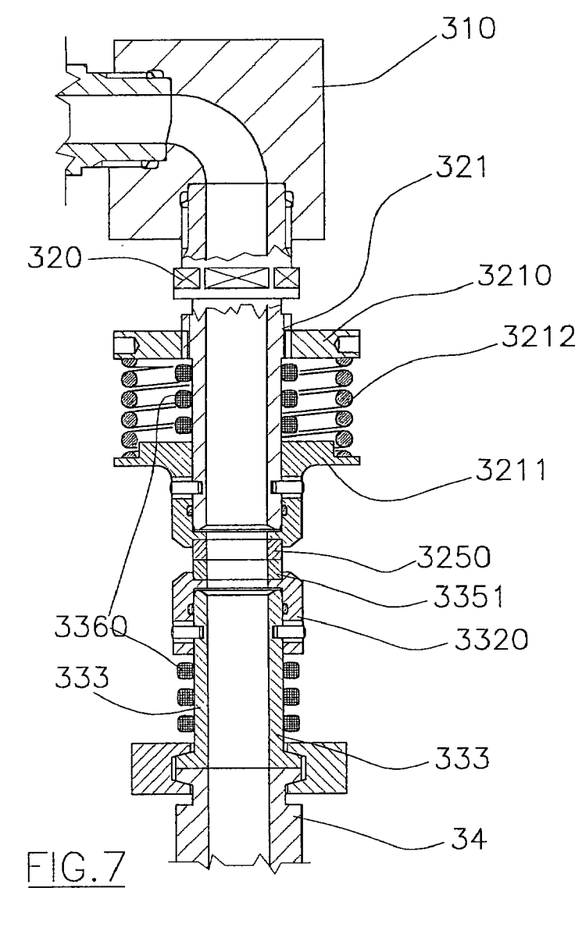

FIGS. 5, 6 and 7 show a second embodiment of the invention, which differs substantially in terms of its construction and the position of the rotary joint.

In the description of the second embodiment of the invention, those components already described and illustrated in the first embodiment are indicated by the same reference numerals.

FIG. 5 shows the plant 30 which comprises a rotary joint 31 consisting of a fixed part 32, connected to the means for feeding the material in the molten state, and an underlying movable part 33 with which the forming devices 5 are associated, by virtue of a part 34. As better shown in FIG. 6, the fixed part 32 of the rotary joint 31 comprises a portion 321 of a conduit 320 sealedly screwed into the part 310 which contains the molten material feed conduit.

With the portion 321 (FIG. 6) of said conduit 320 there is associated a first socket-shaped body 322 rigid with an outer hollow body 323 carrying a lower inner flange 324.

On the flange 324 there rests a rolling bearing 325, the upper ring of which carries a compression spring 331.

The spring 331 elastically supports a second socket-shaped body 332 rigid with the conduit 333 fixed to the part 34.

Two annular seal pads, 335 and 335' respectively, are positioned between the first socket-shaped body 322 and the second socket-shaped 332.

Said pads provide a seal for the molten material when the movable part 33 rotates about the fixed part 32.

An electrical resistance element 336 maintains the temperature of the movable part 33.

FIG. 7 shows an executive variant of the joint 31.

In said variant, to the lower part 321 of the conduit 320 there are fixed an annular flange 3210 and an axially slidable socket-shaped body 3211, between which a compression spring 3212 maintains the body 3211 urged against a socket-shaped body 3320 fixed to the portion 333 of the conduit 320.

A seal ring 3250 is associated with the body 3210 and rests on an identical ring 3251.

This latter rests on the socket-shaped body 3320 rigid with the portion 333 which is fixed to the part 34.

Electrical resistance elements 3360 maintain the temperature of those conduit portions associated with them.

Figure 8:
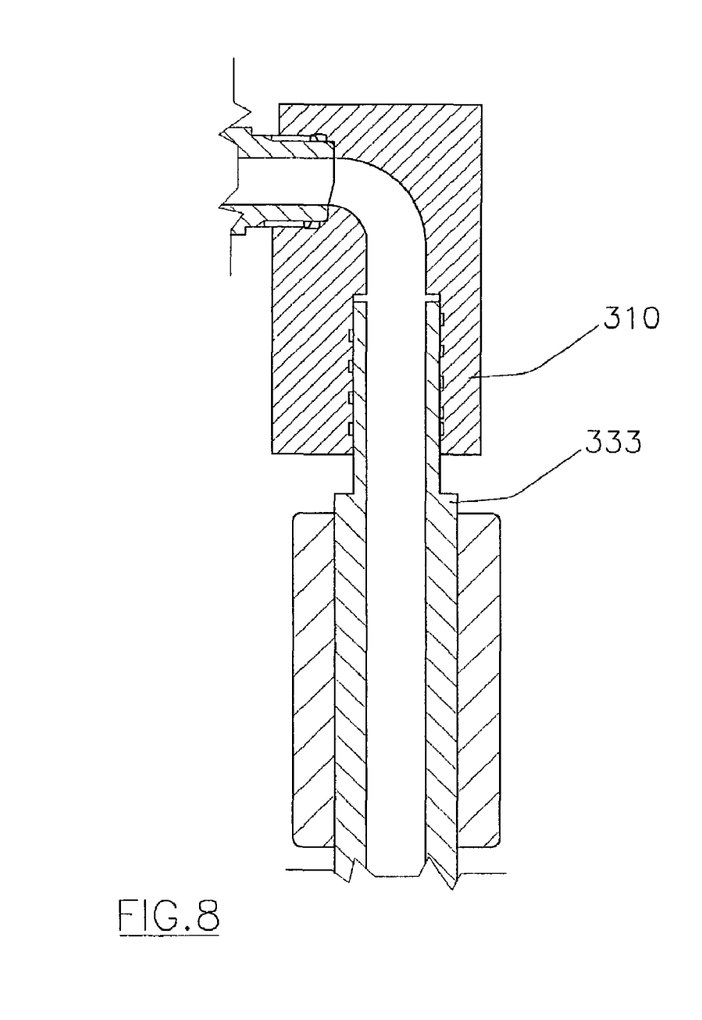
Figure 9:
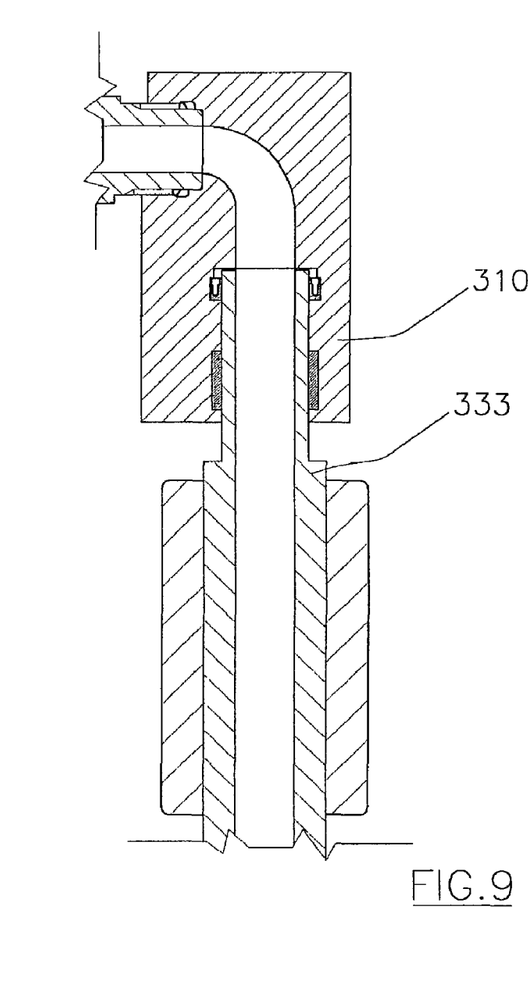
Figure 10:
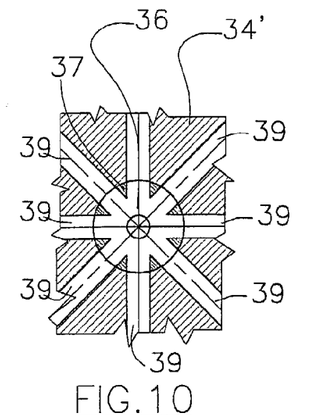

FIGS. 8 and 9 illustrate two different alternative solutions for sealed rotary joints interposed between the conduit 333 and the part 310 shown in FIGS. 4 and 5.

In the embodiment of FIG. 5, the part 34 comprises an enlarged base 34', to the circular peripheral edge of which are fixed the devices 5 and which centrally presents a cylindrical portion 34" rigid with said movable part 33 of the rotary joint 31.

Figure 13:
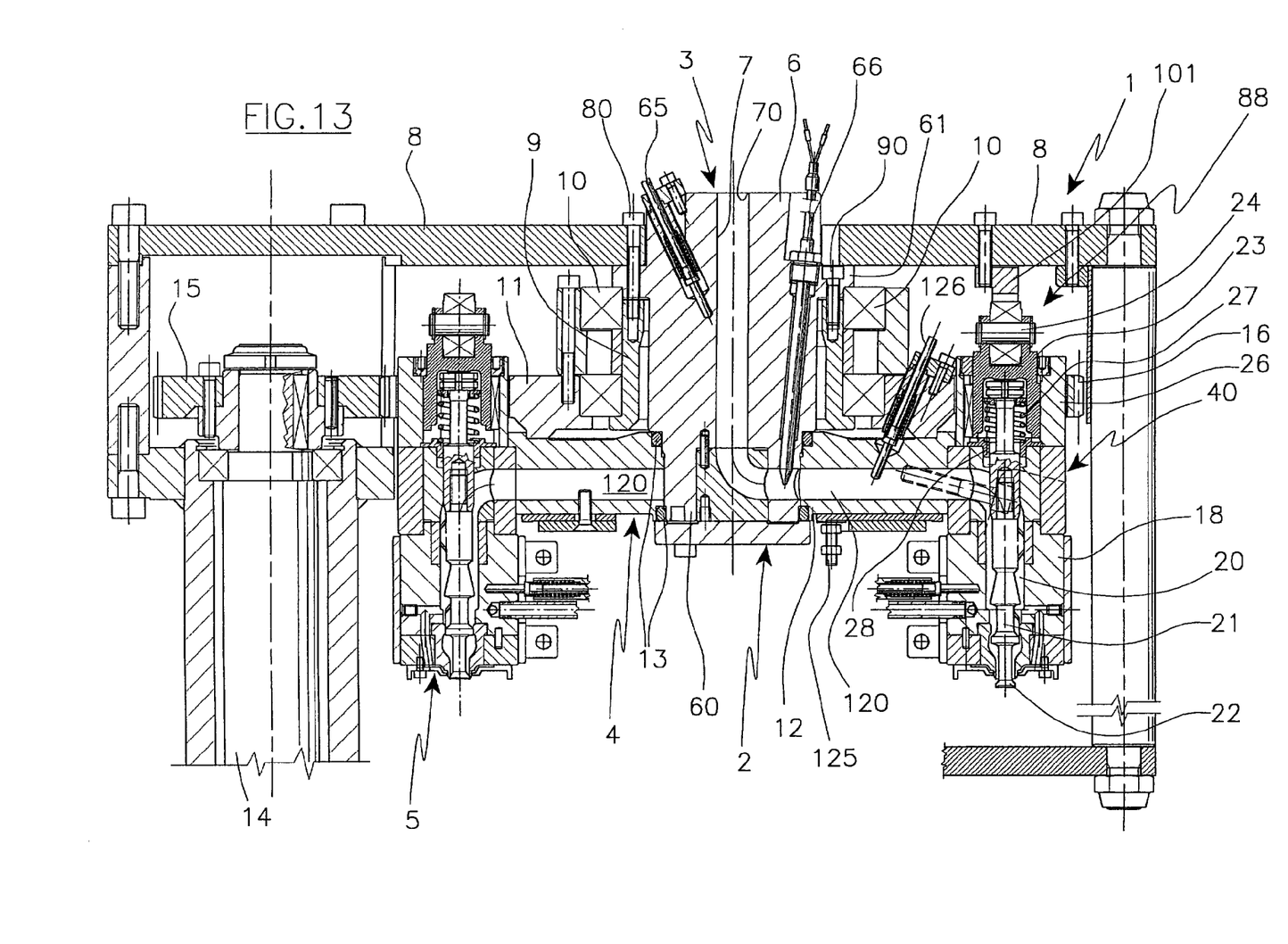
FIG. 13 is an axial section through a further variant of the invention.

The cylindrical portion presents a central material feed conduit 35 which opens into a cavity 38 at the centre of the enlarged base, into which a cylindrical insert 37 is inserted (FIGS. 5 and 13). Said insert presents a central chamber 36 from which there originate a plurality of radial conduits 39 through which the molten material is fed to the devices 5.

Figure 11:
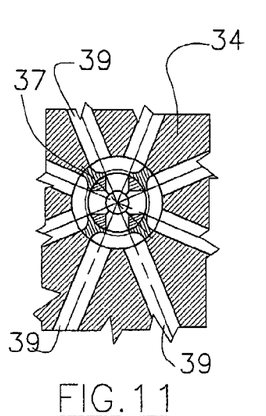
Figure 12:
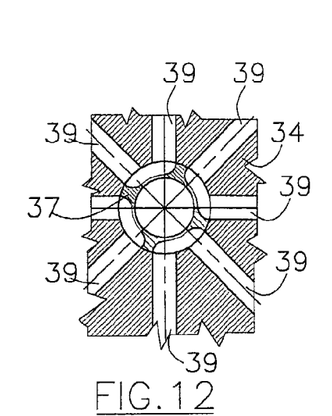

FIGS. 11 and 12 show alternative embodiments of the insert 37 which prevent the synthetic material in the molten state from settling in the interior of the insert.

The description of the devices 5 is omitted as these are identical to those fully described in the first embodiment of the invention. The operation of the invention will now be described with reference to FIGS. 1 and 2, this also enabling the expert to understand the operation of the other embodiments.

The geared motor maintains the movable part 4 of the joint rotating about the fixed part 3 while the material feed means simultaneously feed the material in the molten state into the conduit 7 under pressure. As the conduits 120 of the ring 12 progressively face the discharge mouth 71 of the conduit 7, the material is fed into the conduit 120 by virtue of the pressure to which it is subjected, to cause the predetermined quantity of synthetic material to emerge through the aperture created by the axial translation of the rod 51.

In this respect, the conduits 120 face the mouth 71 at the moment in which the rod 51 is made to translate axially.

As can be seen from FIG. 3, the discharge mouth of the conduit 7 is of divergent shape, such that while the feed to one conduit 120 terminates, the feed to the next conduit 120 commences, in order to limit the maximum pressure within the conduit 7.

FIG. 13 shows the invention with devices for forming annular predetermined quantities applied. In the ensuing description components identical to those already described and illustrated carry the same reference numerals.

Each of the devices essentially comprises a lower part 18 fixed to the ring 12 and provided with a central hole within which there slides a profiled rod 21 which is associated upperly with suitable operating means 88, and lowerly presents a forming head 22 acting as a shutter.

The upper end of the rod 51 is inserted into the cavity in a socket-shaped body 23 which upperly carries an idle cam follower 24 arranged to interact with an overlying cam 101. The cam 25 is rigid with the plate 8, and as a result of the rotation of the plate 12 and the relative devices 5 causes the rod 21 to cyclically lower and open the shutter for discharge of the predetermined quantity of material.

The socket-shaped body 23 slides within a guide sleeve 26 rigid with the lower part 18 and inserted into a hole provided in the annular part 11. The sleeve 26 is provided with an upper ring which acts as a stop element for the travel of the socket-shaped body 23, which is normally maintained against said ring by a spring 27 positioned within the socket-shaped body and mounted about the rod 21.

The lower end of the spring 27 rests on a guide element 28 for the rod 21, whereas the upper end of the spring rests against an upper enlargement of the rod 21.

It should be noted that the operating means for the rod 21 can also be of different type, for example the rod 21 can be driven translationally by operating means of mechanical type shown in FIG. 3, or of electrical type shown in FIG. 4.

Figure 14:
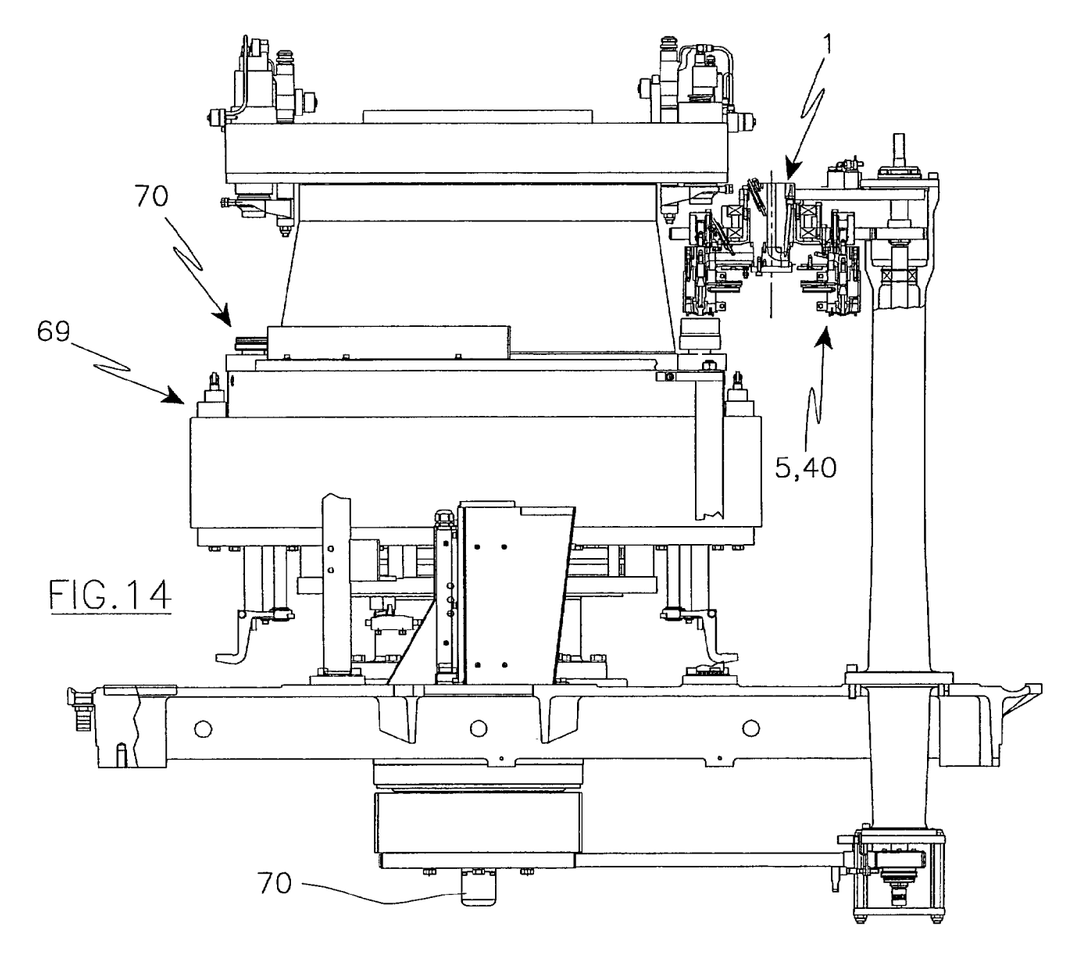
FIG. 14 is a schematic view of the invention combined with a turntable for the compression moulding of the predetermined quantities formed.

Finally, FIG. 14 shows the combination of the described forming plant with a compression moulding turntable 69 provided with a plurality of moulds 70. As can be seen from the figure, the predetermined quantity is dispensed when one of the devices 5 lies above the female portion of the mould 70.

The rotation of the plant 1 is hence synchronous with the rotation and opening of the mould 70 on the turntable, the shutter rod operation being activated by an encoder positioned on the turntable (if its operation is not mechanical).

What is claimed is:

1. A plant for forming predetermined quantities of synthetic material comprising:
a rotary turntable carrying on its periphery a plurality of forming devices presenting a shutter, and
means for feeding the material in the molten state to said forming devices;
wherein said means for feeding comprises:
a fixed part and a rotary movable part integral with the rotary turntable;
a rotary sealed joint connecting said fixed part to said movable part, said movable part being provided with feed conduits for the forming devices in a number equal to the number of forming devices themselves, the fixed part being provided with a single feed conduit directly connected to receive molten material from said means for feeding the material in the molten state and to feed the molten material to said forming devices one at a time in succession during the rotation of the movable part about the fixed part;
operating means for interacting with the forming devices positioned on the rotary turntable to operate them in the sense of opening and closing them in response to the rotations of the turntable, and means for rotating the turntable.

2. A plant as claimed in claim 1, characterised in that the fixed part comprises a central body traversed by the material feed conduit and terminating in a cylindrical stem into which said conduit opens radially, the rotary turnable being sealedly mounted on said stem by way of interposed seal means.

3. A plant as claimed in claim 2, characterised in that said material feed conduit diverges in proximity to the mouth which opens radially into said stem.

4. A plant as claimed in claim 2, characterised in that the rotary turntable comprises a number of radial conduits equal to the number of forming devices and arranged to face in succession the radial end of the feed conduit.

5. A plant as claimed in claim 1, characterised in that the operating means arranged to interact with the forming devices positioned on the rotary turntable to operate them in the sense of opening and closing them in response to the rotations of the turntable are rigid with the fixed part.

6. A plant as claimed in claim 5, characterised in that said seal means comprise a cup cam coaxial with the turntable and arranged to interact with a cam follower wheel rigid with said rod.

7. A plant as claimed in claim 1, characterised in that said operating means arranged to interact with the forming devices positioned on the rotary turntable to operate them in the sense of opening and closing them in response to the rotations of the turntable comprise a cylinder-piston unit, the rod of which is associated with the shutter.

8. A plant as claimed in claim 7, characterised in that said operating means arranged to interact with the forming devices positioned on the rotary turntable to operate them in the sense of opening and closing them in response to the rotations of the turntable are of electrical type.

9. A plant as claimed in claim 8, characterised in that said operating means of electrical type comprise a coil, the state of energization of which determines the translations of the rod of said forming devices.

10. A plant as claimed in claim 1, characterised by being associated with a turntable provided with a plurality of moulds for compression moulding the predetermined quantities formed by said forming devices.

11. A plant as claimed in claim 10, characterised in that the positioning of the forming devices relative to said moulds is controlled by an encoder associated with said turntable.

* * * * *